May 22, 1923.
W. C. COX
1,455,906
ENDLESS TRACK STRUCTURE FOR MOTOR DRIVEN VEHICLES
Filed March 1, 1920        3 Sheets-Sheet 1
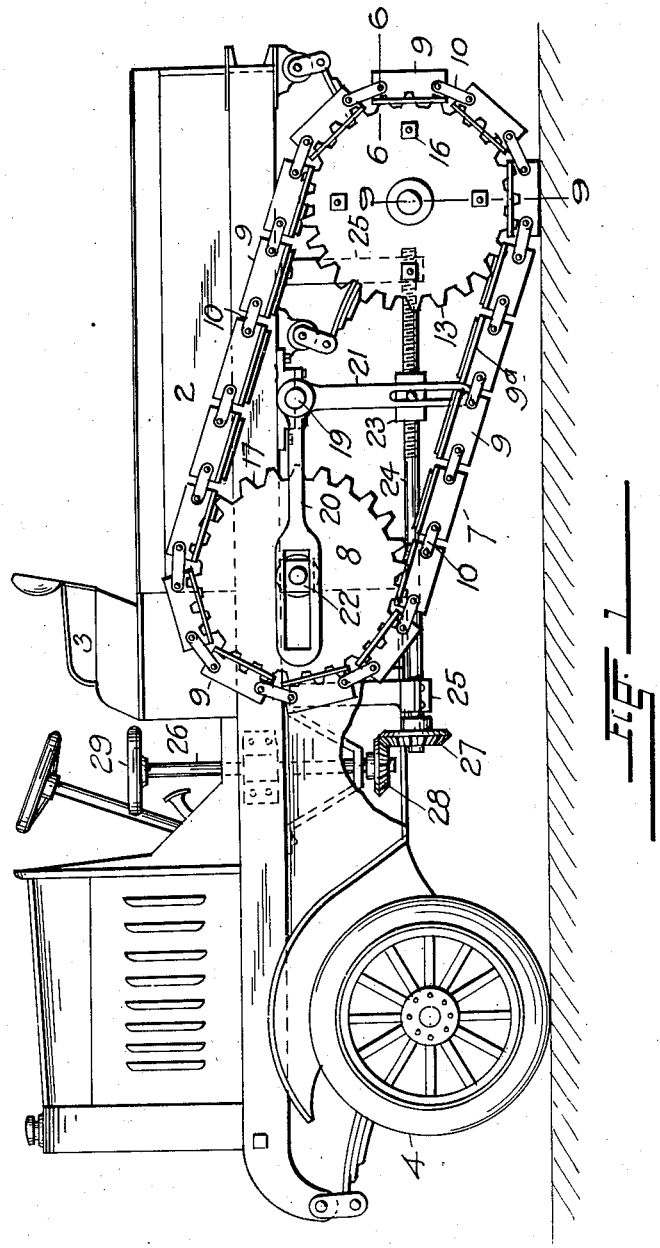
INVENTOR.
W. C. Cox.

May 22, 1923.
W. C. COX
1,455,906
ENDLESS TRACK STRUCTURE FOR MOTOR DRIVEN VEHICLES
Filed March 1, 1920
3 Sheets-Sheet 2
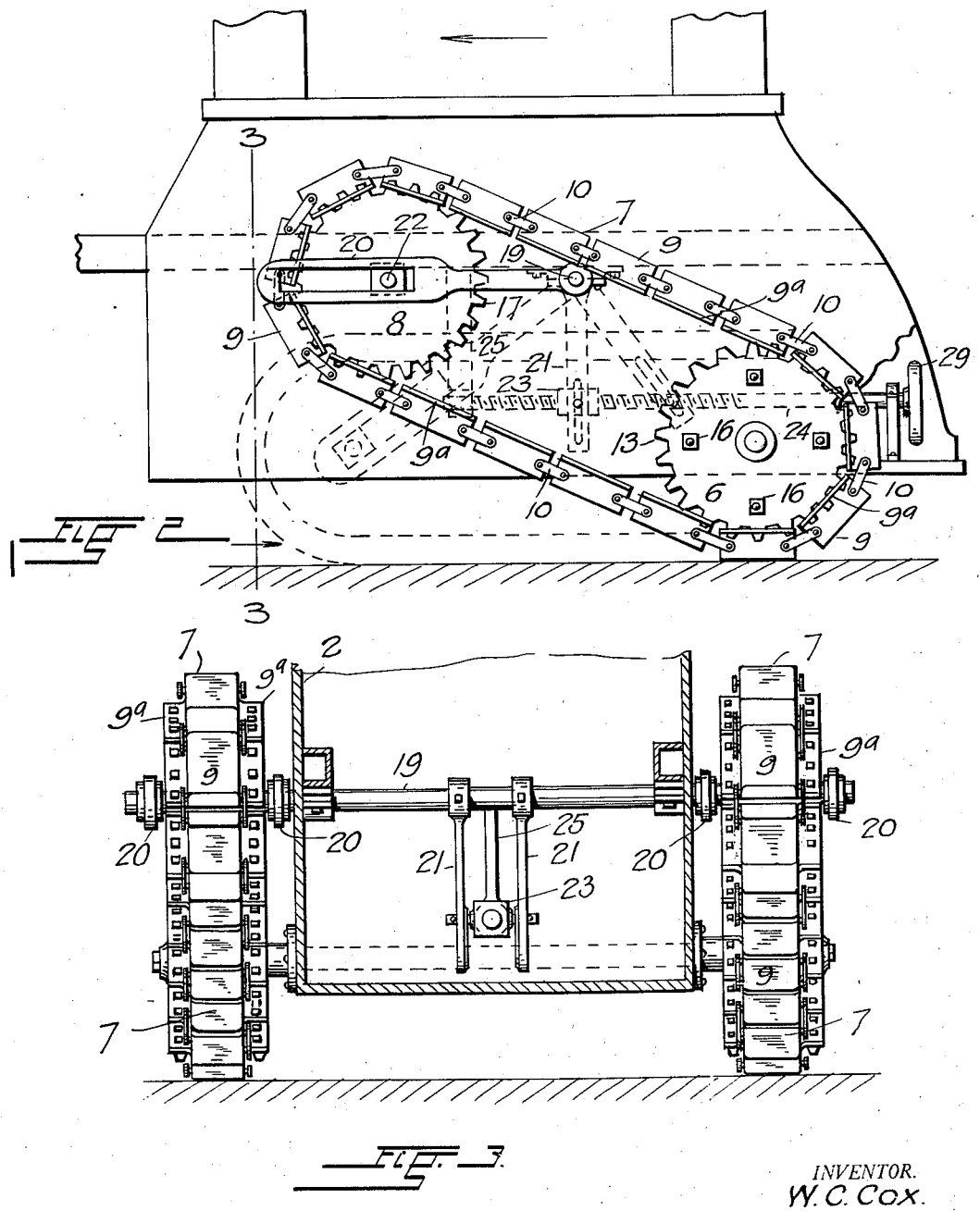
INVENTOR.
W. C. Cox.

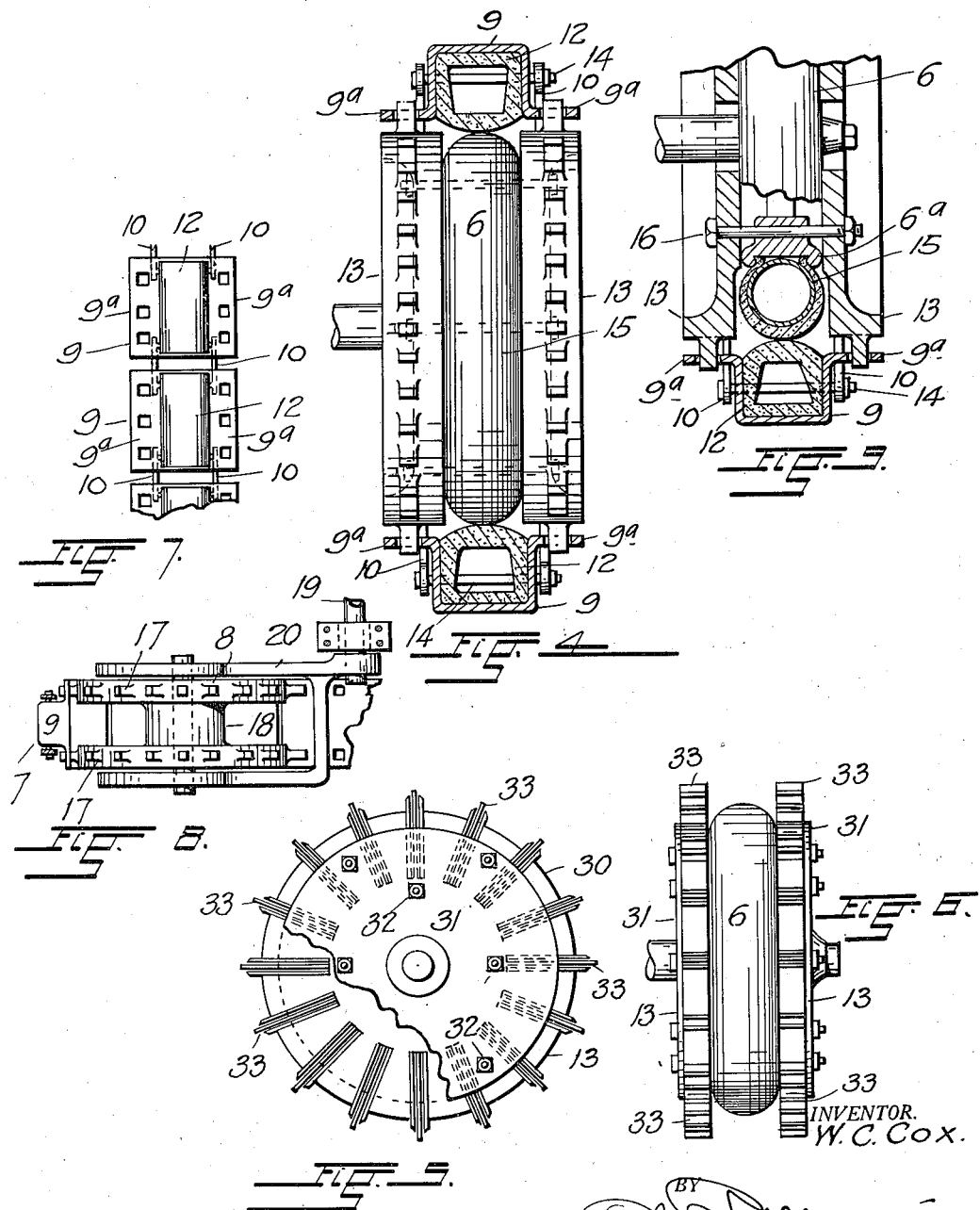

Patented May 22, 1923.

1,455,906

UNITED STATES PATENT OFFICE.

WALTER CECIL COX, OF DENVER, COLORADO.

ENDLESS-TRACK STRUCTURE FOR MOTOR-DRIVEN VEHICLES.

Application filed March 1, 1920. Serial No. 362,220.

*To all whom it may concern:*

Be it known that I, WALTER CECIL COX, a citizen of the United States, residing at Denver, in the county of Denver and State of Colorado, have invented certain new and useful Improvements in Endless-Track Structures for Motor-Driven Vehicles, of which the following is a specification.

This invention relates to motor-driven vehicles of what is commonly known as the type in which the driving or traction wheels of the vehicle bear upon movably supported endless tracks.

It is the primary object of the present invention to provide in a vehicle of this type, improved means for cushioning the movement of the vehicle wheels upon their respective tracks without loss of motive power.

Another object of the invention resides in providing resilient means to transmit the motive energy of the traction wheels to the track whereby to relieve the cooperating parts of part of the strain to which they are subjected when the vehicle is set in motion or when it is employed in transporting heavy loads.

Another object of my invention resides in providing an efficient and simple mechanism for varying the extent of contact of the endless tracks with the ground over which the vehicle is propelled, whereby to regulate the degree of traction according to varying conditions and facilitate movement of the vehicle in turning from a straight course.

A further object of the invention is the provision of a traction means which is applicable for use on trucks as wells as on tractors, and still other objects of the invention reside in certain improvements in the construction of the endless track and traction wheels and their adjusting mechanism and in the cooperative arrangement of the parts, all of which serve to combine simplicity of construction with a high degree of efficiency and practicability in use.

With the above objects in view, my invention consists of the construction and combinations of parts hereinafter to be described and illustrated in their preferred embodiment and application in the accompanying drawings in the various views of which like parts are similarly designated and in which Figure 1 represents a side elevation of a truck to which my invention is applied;

Figure 2, a side elevation of the rear portion of a tractor equipped with my improved traction devices;

Figure 3, a section taken on the line 3—3, Figure 2;

Figure 4, a face view of one of the driving wheels of the vehicle showing the endless track in transverse section;

Figure 5, a fragmentary side elevation of a modified construction of the traction wheels;

Figure 6, a face view of the same;

Figure 7, a top view of a portion of one of the endless tracks;

Figure 8, a top view of the front end of the endless track and its supporting lever, as shown in Figure 1, and Figure 9, a section taken on the line 9—9, Figure 1 drawn to an enlarged scale.

Referring first to Figure 1 of the drawings, the reference character 2 designates the body of a motor truck of ordinary construction having a driver's seat 3, and supported at its front end upon steering wheels 4.

The driving or traction wheels 6 at the rear end of the vehicle bear upon endless tracks 7 which forward thereof, are movably supported upon idler wheels 8 which are rotatably connected with a normally stationary adjusting mechanism the construction of which will hereinafter be more fully described.

The endless tracks are each composed of a series of equidistantly spaced sections 9 articulately connected by pairs of links 10.

The sections of the track each consist of an open box or retainer made of steel or other wear-resisting metal and provided with laterally projecting flanges 9ª at its upper edge.

Fillers 12 of rubber, wood or other nonmetallic and elastic material, driven, cast or otherwise fitted in the box shaped sections of the track, have rounded bearing surfaces which in the preferred form of my invention extend above the flanged upper edges of the same for engagement with the tread of the driving wheel of the vehicle to which the track is applied.

The flanges of the track sections are provided with a plurality of alined equidistant openings to receive the teeth of sprocket wheels forming part of the traction wheels of the vehicle as will further be explained and the pairs of links by which the sections are articulately connected are fastened thereto by means of bolts 14 which extend through alined openings in the sides of the sections and their elastic fillers.

The traction wheels of the vehicle each have in connection with the usual hub, a felly 6ª adapted for the support of a pneumatic tire 15, and at opposite sides thereof, sprocket wheels 13 arranged to engage with the openings in the flanges of the track sections while the pneumatic tires ride upon the elastic fillers of the same.

The sprocket wheels are separate from the tire wheel and rigidly connected to the felly of the same by bolts 16. The idler wheels which support the endless tracks forward of the traction wheels, have two circular series of sprocket teeth 17 mounted circumferentially of a common hub 18 and laterally spaced to simultaneously engage the openings in the flanges of the track sections.

On tractors designed to move over rough and irregular surfaces and in connection with movement-resisting ground-tilling instruments, or on heavily loaded trucks, it is to advantage to increase the traction of the driving wheels and absorb obstructions in the path thereof by extending the endless tracks along the ground at a regulatable distance forward of the traction wheels, while in case the truck or tractor is not heavily loaded or is moved along a smooth-surfaced roadway, or in case it is turned from a straight course, it is to advantage to raise the greater extent of the tracks from the ground to thereby decrease the frictional resistance to the movement of the vehicle.

In order to raise or lower the tracks at will and thereby vary the extent of their contact with the surface of the ground in agreement with the above mentioned conditions, the idler wheels are adjustably supported on the chassis of the vehicle for the following appliance.

A rocker shaft 19 mounted in suitable bearings on the chassis has at its ends bifurcated and forwardly extending, longitudinally slotted arms 20 for the support of the idler wheels at opposite sides of the vehicle, and intermediate thereof, a pair of downwardly extending arms 21 for its connection with an operating mechanism located within easy reach of the driver of the vehicle.

Boxes 22 in which the idler wheels are rotatably mounted are slidably supported in the slots of the arms 20 and a trunnioned nut 23 is movably disposed between the longitudinally slotted arms 21. A feed screw 24 cooperating with the nut is rotatably mounted in hangers 25 on the chassis of the vehicle and connects at its forward end with an upright operating shaft 26 through the medium of a set of beveled gears 27 and 28.

A small hand-wheel 29 at the upper end of the shaft 26 is disposed in proximity to the seat of the driver of the vehicle who thereby is enabled to adjust the tracks while the vehicle is in motion.

In the construction shown in Figure 2 the upright shaft and the gearing have been omitted and the hand-wheel is directly applied at the end of the screw-shaft above the platform occupied by the driver of the tractor.

To better illustrate the operation of the adjusting mechanism hereinbefore described, the extreme position of the track in which it engages the ground to its full extent, has been shown in Figure 2 of the drawings in broken lines.

On trucks designed to haul heavy loads the strain on the engine and the mechanism for transmitting its motive energy to the driving wheels may be considerably reduced, especially when the vehicle is initially set in motion, by providing the traction wheels with resilient sprocket teeth which under stress will give to a limited extent.

A preferred method of constructing these teeth has been illustrated in Figures 5 and 6 in which each sprocket wheel is composed of a radially recessed body part 30 and a plate 31 which are connected by bolts 32.

The sprocket teeth are each formed of a plurality of spring-metal blades 33 placed within the recesses of the body member of the wheel and extending beyond the circumference thereof.

The blades of each group are made of different lengths to give to the teeth formed of their projecting portions, the taper required for their movement into and from the apertures in the side flanges of the sections of the tracks.

Having thus described my invention it is obvious that changes in the construction, dimensions and relative arrangement of the parts may be made without departing from the spirit thereof.

What I claim and desire to secure by Letters Patent is:

1. In a motor-vehicle of the character described, a traction wheel having a tire and series of radially extending sprocket teeth at opposite sides thereof, and an endless track composed of linked sections each consisting of a box-shaped retainer having flanges which are apertured to cooperate with the sprocket teeth, and a cushion filler in the retainer engaging the tread of the tire.

2. In a motor-vehicle of the character described, a traction wheel having a tire and series of sprocket-teeth at opposite sides thereof, and an endless track composed of linked sections each consisting of a retainer having flanges which are apertured to co-operate with the sprocket-teeth, and a non-metallic filler in the retainer engaging the tread of the tire.

In testimony whereof I have affixed my signature.

WALTER CECIL COX.